April 2, 1968 R. W. NEWMAN 3,375,778
APPARATUS FOR UNLOADING COMPLETED WOODEN STRUCTURAL ELEMENTS
Filed July 25, 1966 3 Sheets-Sheet 1

INVENTOR
ROBERT W. NEWMAN

BY *LeBlanc and Shur*

ATTORNEYS

April 2, 1968     R. W. NEWMAN     3,375,778
APPARATUS FOR UNLOADING COMPLETED WOODEN STRUCTURAL ELEMENTS
Filed July 25, 1966     3 Sheets-Sheet 3

INVENTOR
ROBERT W. NEWMAN
BY
ATTORNEYS.

United States Patent Office 3,375,778
Patented Apr. 2, 1968

3,375,778
APPARATUS FOR UNLOADING COMPLETED WOODEN STRUCTURAL ELEMENTS
Robert W. Newman, Miami, Fla., assignor to Automated Building Components, Inc., Miami, Fla., a corporation of Florida
Filed July 25, 1966, Ser. No. 567,428
19 Claims. (Cl. 100—215)

ABSTRACT OF THE DISCLOSURE

The apparatus for unloading finished wooden structural elements, such as roof trusses, comprises a conveyor operable to advance a jig table carrying a roof truss or the like to successively locate the longitudinally spaced butt joints thereof below a press platen for embedment into the butt joints of nail plates of the type having a plurality of teeth struck therefrom and thereafter unloading the truss or the like from the jig table. A lift bar is pivotally mounted on the jig close to the leading joint or nail plate and the bar spring biased in such a manner as to tend to raise its free end. The bar is locked downward against this bias by a pin which is longitudinally movable against the action of a return spring. When the pin is in a position to compress this spring, its other end engages the bar and holds it in a lowered position. The pin is held against the force of the spring by the frictional engagement between the bar and the pin. When the bar is depressed, as through downward movement of the truss when the forward nail plate is pressed into the lumber, the frictional engagement between the bar and the pin is released, the pin is returned by the spring, and the bar is free and tends to rotate in a manner to lift the leading edge of the truss. Such lifting occurs just as soon as the truss is released by the press and, as the jig advances, the leading edge of the truss then passes over a stripping roller so that the truss may be lifted free of the jig. A cocking bar is provided for cocking or depressing the lifting bar against the action of its spring.

---

This invention relates to automatic machinery for producing wooden structural elements, and more particularly to an apparatus which aids in the unloading of finished wooden structural elements such as roof trusses from the automatic machinery by which it is produced.

In recent years, there has been a marked trend toward prefabrication of essential building components, particularly in the construction of relatively low-cost housing. While various portions of houses have been preassembled in this fashion, probably the most commonly prefabricated element at this time is the monoplane roof truss.

At the same time, prefabrication itself has undergone an evolution from joint formation by hand-nailing and bolting techniques to the vastly improved mode of construction which was made possible by the advent of structural butt joints formed with unitary connectors of the type described in United States Patent No. 2,877,520, of common ownership herewith. In the production of prefabricated roof trusses with the joint of that patent, use has been made of jig assemblies, an example of which is described in U.S. Patent No. 3,241,585, of common ownership herewith, issued on Mar. 22, 1966. However, whereas it is now possible to manufacture trusses of various sizes with a minimum of skilled labor and at markedly reduced costs, it has been found that the trusses, which may be of substantial weight, are bulky and somewhat awkward to remove from the jig assembly.

According to the present invention, it has now been found that it is not only possible to remove completed wooden structural elements, such as trusses, from jigs as the jigs progressively leave the press, but to do so at least semi-automatically, without the necessity of employing manual labor of jig unloading personnel. In addition, the apparatus of the instant invention enables the initiation of a jig unloading operation at the jig exiting end of the press, while the rearward portions of the jig are still being operated upon by the press. The foregoing is accomplished according to the present invention by a press actuated apparatus which raises the forward end of a jig mounted truss, as the jig emerges from the press, to a position for surmounting the leading roller of an output roller assembly. Continuing forward movement of the jig through the press results in the completed truss being entirely lifted from the jig and positioned upon the output roller assembly for easy removal to a suitable storage rack.

It is accordingly a primary object of the present invention to provide an improved unloading device for use with apparatus for manufacturing wooden structural elements.

It is another object of this invention to provide an improved truss unloading arrangement which incorporates a truss elevating device that is automatically operable to elevate one end of the completed truss from a jig pad and accordingly assist in its unloading.

It is yet another object of the invention to provide a jig unloading apparatus which enables rapid unloading and storage of completed wooden structural elements with a minimum of manual labor.

It is another object of this invention to provide a truss unloading apparatus which may be incorporated into presently available truss jig producing systems with a minimum of modification to the existing system.

It is a further object of this invention to provide a jig unloading apparatus that is economical to manufacture, long lasting, and easy to install.

It is still another object of this invention to provide a jig unloading apparatus which will increase the production rate of truss producing machinery and its crew, and, at the same time, reduce worker fatigue.

It is yet another object of the invention to provide a system for unloading completed trusses from truss-producing machinery by elevating the forward end of a jig mounted truss as the leading portion of the jig emerges from a press, advancing the jig carrying the truss through the press until the front stripper roller of an unloading roller assembly which is operatively positioned along and above the path of jig travel posteriorly of the press is engaged by the elevated forward end of the truss, continuing to progressively move the jig through the press and above the unloading roller assembly until the completed truss is entirely supported upon the unloading roller assembly.

These and further objects and advantages of the invention will become more apparent upon reference to the following specification, claims, and appended drawings, wherein;

Figure 6:
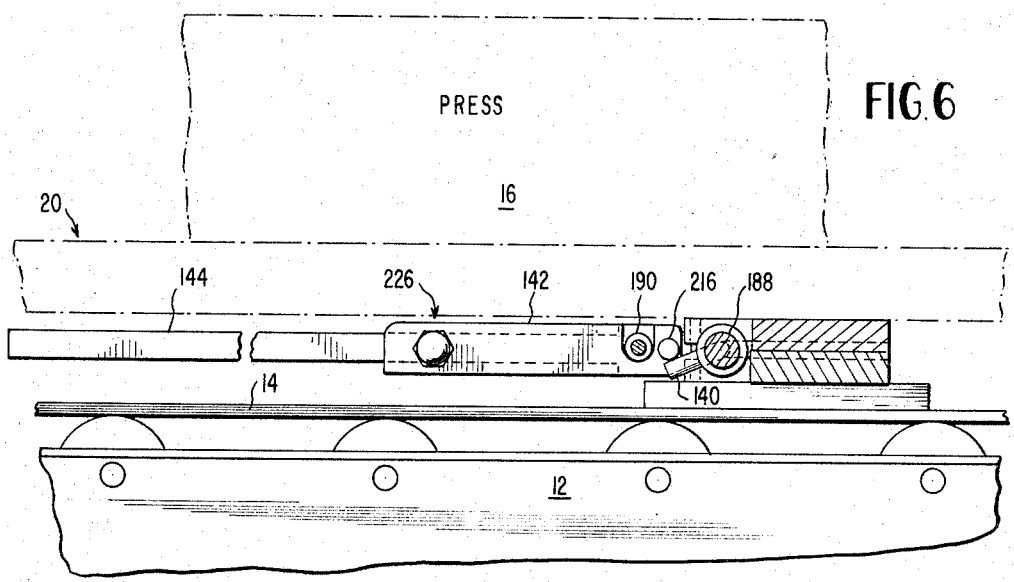
Figure 7:
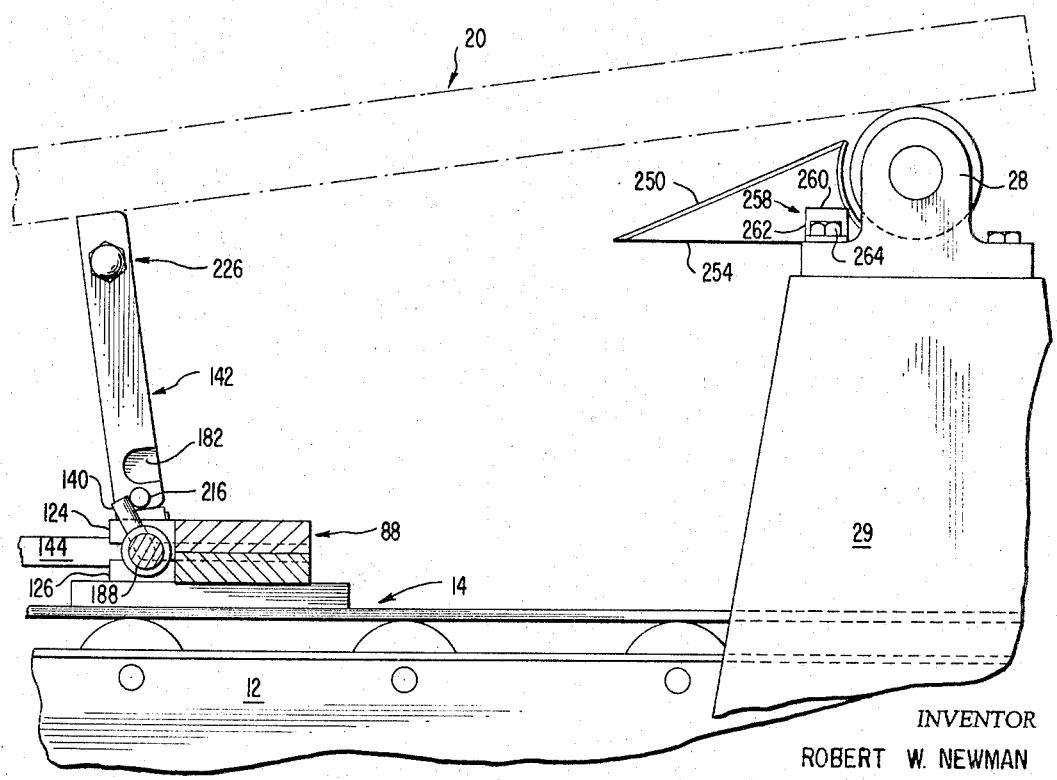

FIGURE 6 is a fragmentary side elevational diagrammatic representation of the manner in which the cocked truss lifting bar is actuated by a pressing operation at the leading end of the jig; and FIGURE 7 is a fragmentary side elevational view which illustrates the manner in which the torsion rod drives the truss lifting bar into an upright position after the leading end of the jig, as shown in FIGURE 6, passes through the press to the unloading side of the system, and the elevating of the leading end of the truss for positioning upon the front roller of the unloading roller assembly.

Figure 1:
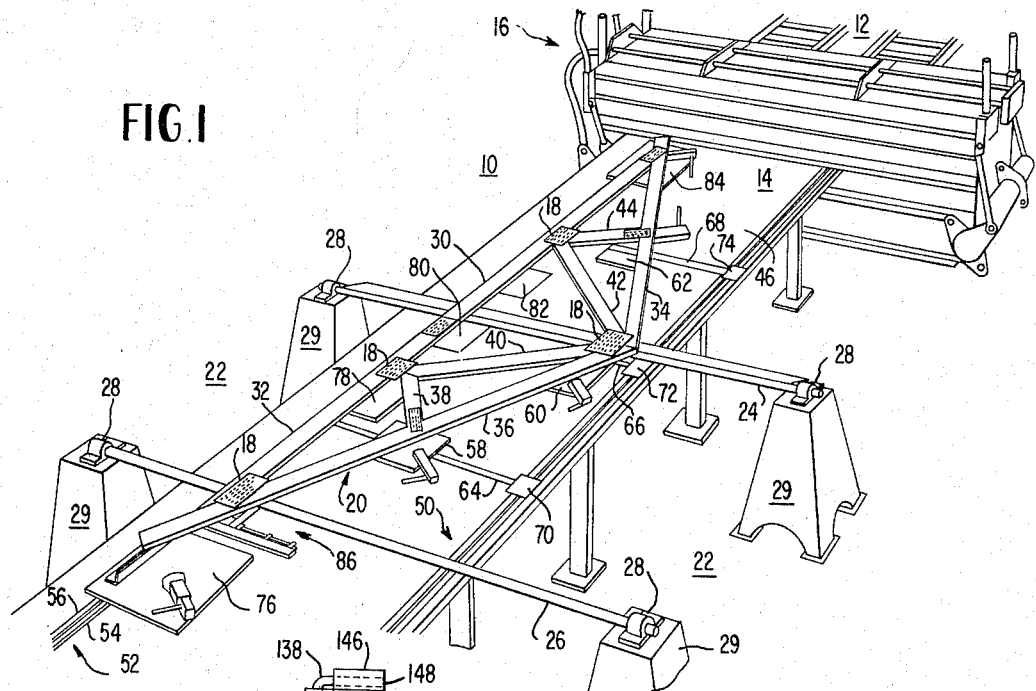
FIGURE 1 is a perspective view illustrating automatic machinery for manufacturing trusses, and shows a completed truss positioned upon the unloading roller assembly by the apparatus of this invention.

Referring to the drawings and more particularly to FIGURE 1, there is shown a perspective view of an automatic system 10 for manufacturing wooden structural members, such as trusses. As shown, the system 10 includes a conveyor, generally shown by the numeral 12, over which jig assemblies 14 are carried. The conveyor 12 is shown to lead into a press 16, which may be of the type shown, for example, in assignee's Patent 3,195,449.

As illustrated, the press 16 is operative to press unitary connectors 18 into the structural butt joints in a progressive manner from the front to the rear of universal jig assembly 14, in accordance with the sequential operation of the press. Conveyor 12 is shown to extend through press 16 to thereby carry the jig assembly 14 and the jig mounted truss 20 with it. As will be explained hereinafter, the apparatus of this invention is effective to position the completed truss 20 upon the unloading roller assembly shown generally by the numeral 22.

The unloading roller assembly 22 comprises front stripper roller 24 and rear stripper roller 26, which are shown to be supported at the unloading side of the system 10, spacially along the longitudinal path of jig travel, transversely over and above the conveyor 12. The front stripper roller 24 and rear stripper roller 26 are supported sufficiently above the conveyor 12 so that the truss 20 may be lifted from the universal jig assembly 14 while the jig is continually moving upon the conveyor 12. The ends of front stripper roller 24 and rear stripper roller 26 are shown to be mounted in self-aligning roller bearing pillow blocks 28, and the self-aligning roller bearing pillow blocks 28 are bolted to stands 29.

As has been mentioned, the chords and web members which are to be joined together in press 16 to form a completed truss are manually positioned and clamped in the pre-set jig assembly 14. Only the more significant details of the jig assembly 14 which will be useful to bring out the environment of the invention are illustrated, and reference is made to applicant's hereinabove identified U.S. Patent No. 3,241,585 for a more detailed description of the jig assembly and the working relationship of the elements making up the same.

The jig assembly 14, see FIG. 1, is shown to be pre-set for production of a gable type truss consisting of bottom or tie chords 30 and 32, top chords 34 and 36, and web members 38 through 44. The jig assembly 14 comprises a jig pad or pallet 46 formed of a large heavy sheet of metal, or of a thin sheet of metal suitably reinforced, or of any other suitable structural material upon which the elements of the jig may be mounted. A first pair of longitudinally extending stationary guide bars generally indicated at 50 are shown adjacent to one side of jig assembly 14, and a second pair of longitudinally extending stationary guide bars 52 are shown mounted to the opposite side of the jig assembly. As explained in greater detail in the herein above identified U.S. Patent No. 3,241,-584, reaction pad assemblies 58, 60, and 62 are adjustably mounted for selective positioning transversely of jig pad 46 upon transversely extending guide bars 64, 66 and 68 respectively. Further, transversely extending guide bars 64, 66 and 68 are provided with suitable connectors 70, 72 and 74 respectively to enable selective positioning along the first pair of longitudinally extending stationary guide bars 50. By the above structure reaction pad assemblies 58, 60 and 62 are selectively positioned upon jig pad 46, below the butt joints formed by top chords 34–36 and web members 38–44.

Similarly, reaction pad assemblies 76, 78, 80, 82 and 84 are shown to be selectively positionable along the second pair of longitudinally extending stationary guide bars 52. More particularly, as shown in FIGURE 1, the reaction pad assemblies 76 through 84 are longitudinally positionable along upper horizontal guide bar 54 and lower horizontal guide bar 56 to positions below the butt joints formed by the top chords 34–36, web members 38 through 44, and bottom chords 30 and 32. This is described in greater detail in the hereinabove mentioned U.S. Patent No. 3,241,584, to which reference is made. The only elements of the universal jig assembly 14 which will be referred to hereinafter are the upper and lower horizontal guide bars 54 and 56 and reaction pad 76 which, since it is positioned adjacent the end of the universal jig assembly 14 which is first to enter into and exit from press 16, will hereinafter be called the leading reaction pad assembly 76.

For purposes of background, the jig is utilized by spotting connector plates 18 on each of the reaction pad assemblies 58 through 62 and 76 through 84 with their teeth extending upwardly. The wooden chords and web members 30–44 are then clamped on top of the teeth of the unitary connectors, and a second set of such connector plates is laid on top of the wooden chords and web members, with their teeth directed downwardly. The leading end of the jig assembly 14, which is being carried over conveyor 12, is then advanced between the base and head of press 16 to place the leading reactor pad assembly 76 therebetween, and thus simultaneously press the top and bottom unitary connectors 18 associated therewith into the wooden chords 32 and 36. Repeated sequencing of the press will result in all of the remaining reaction pads 58, 60, 62, 78, 80, 82, and 84 being passed between the base and head of press 16 so that the remaining unitary connectors 18 will be pressed into the truss forming chords and web members. As the pressing occurs, the chords and web members move downwardly from a position above the reaction pads where they are supported by the teeth of the bottom unitary connectors 18, to a final position in abutment with the reaction pad assemblies, see FIGURE 6. In so doing, pressure is exerted on the reaction pad assemblies, the significance of which will become clear hereinafter.

As the press 16 is sequenced to advance the various reaction pad assemblies, beginning with leading reaction pad assembly 76 and ending with reaction pad assembly 84, between its base and head, the jig assembly 14 will move progressively through the press, upon conveyor 12, to the unloading roller assembly 22 posteriorly thereof. As mentioned, the longitudinally spaced apart front stripper and rear stripper rollers 24 and 26 are elevationally positioned above the conveyor 12 and, therefore, unless the leading end of the truss is elevated upon leaving the press 16, the truss 20 and universal jig assembly 14 upon which it is carried will both pass below the unloading roller assembly 22 and the truss will thus not be lifted from the jig. The apparatus which elevates the leading end of the truss 20 from the universal jig assembly 14 to thus assure that the truss will be positioned upon the unloading roller assembly 22, and the manner in which it is actuated, will now be discussed.

As shown in FIGURE 1, a truss elevating assembly 86 is mounted as close to and behind the leading reaction pad assembly 76 as is practicable, depending on the length and weight of the truss 20 being fabricated, and below the bottom chord 32, see FIGURE 6. The truss elevating assembly 86 is actuated by the pressing operation of press 16 upon the leading reaction pad assembly 76 in a manner to be described in greater detail hereinbelow, to result in the leading end of truss 20 being elevated upon passage through the press such that it will override the front stripper roller 24, see FIGURE 7, and the continuing movement of the jig through the press and below the unloading roller assembly 22 will result in the transfer of completed truss 20 to the position shown by FIGURE 1. From this position the completed truss 20 may be readily removed from the unloading roller assembly 22 to a storage stand, not shown.

Figure 2:
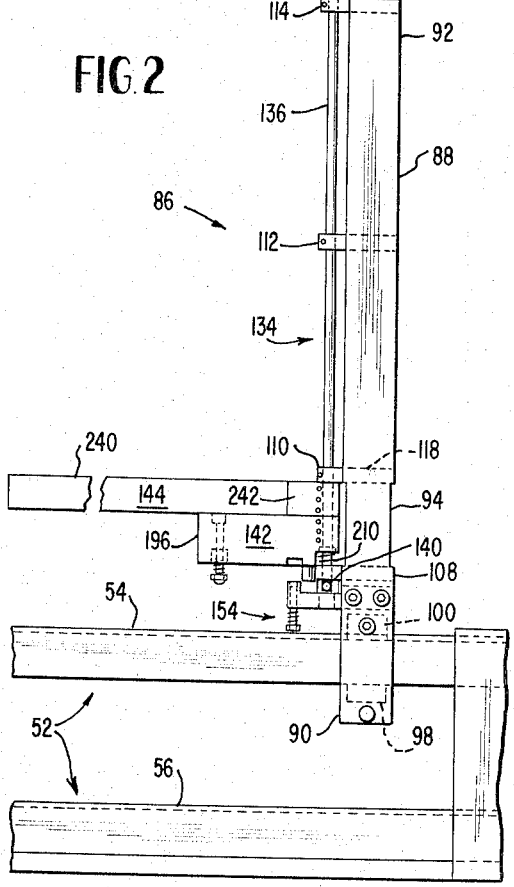
FIGURE 2 is a plan view of the apparatus of this invention in its mounted position to the guide bar members of the universal jig assembly, which are shown in fragmented form.

FIGURES 2 through 7 illustrate the truss elevating assembly 86 in greater detail. As shown, assembly 86, which is manually pre-set for actuation by press 16, includes an elongated mounting bar 88 having a mounting end 90, unattached end 92, and a narrowed section 94, for purposes to be explained hereinafter. The elongated mounting bar 88 is shown in FIGURE 2 to be adjustably fixedly positionable along upper horizontal guide bar 54, and to extend transversely therefrom; however, as an alternative, the elongated mounting bar 88 may be adjustably fixedly positionable to lower horizontal guide bar 56. As has been stated, the truss elevating assembly 86 is to be positioned as close to the leading reaction pad assembly 76 as is practicable, depending upon the length and weight of the truss 20 being fabricated. The manner in which the truss elevating assembly 86 is adjustably fixedly mounted to upper horizontal guide bar 54 to accommodate different sizes of trusses will now be discussed.

Elongated mounting bar 88 is provided with a block shaped abutment 98 which is fixedly secured, as by welding, brazing, etc., to the bottom thereof, adjacent its mounting end 90. As shown by FIGURES 2 and 4, the block shaped abutment 98 abuts against the inner longitudinal sides of the upper horizontal guide bar 54 and prevents movement of the elongated mounting bar 88, away from the longitudinally extending stationary guide bars 52. As may be seen in FIGURE 3, the outer longitudinal side of upper horizontal guide bar 54 is formed with a horizontally projecting flange 55 across its entire length. A clamp block 100, having a horizontal flange 102 integrally formed and projecting from its lower surface, is secured to the bottom of the elongated mounting bar 88 by bolt 104, see FIGURE 4, in opposed relationship to block shaped abutment 98 to thereby clamp the upper horizontal guide bar 54 therebetween.

As shown by FIGURES 2 through 5, a series of torsion rod support brackets 108 through 114 are spacially positioned longitudinally across the elongated mounting bar 88. The torsion rod support brackets 108 through 114 are each provided with an elongated body 118 which is secured to the bottom of elongated mounting bar 88 by welding, brazing, etc., and each terminates in a projecting head 120, see FIGURE 3. The projecting heads 120 are each bifurcated by a slot 122 to form opposed portions 124 and 126, having aligned apertures 128 for receipt of a torsion rod retaining pin 130. A torsion rod generally shown by the numeral 134 is rotatably received in suitable openings within the slots 122 of projection heads 120. The torsion rod has a main portion 136, a rearwardly bent end 138 (FIGURE 2), and a twistable upwardly projecting hooked end 140. The two torsion rod support brackets 108 and 110 are spaced in closer proximity to each other than are the other torsion bar support brackets, at opposite sides of the narrowed section 94 of the elongated mounting bar 88. Section 94 is narrower than the remainder of elongated mounting bar 88 to permit free rearward pivotable movement of a lift bar assembly 142 and a cocking bar assembly 144 (FIGURE 2), about the main longitudinally extending rod portion 136 of torsion rod 134, without being limited by engagement with the edge of elongated mounting bar 88.

Mounted at the unattached end 92 of elongated mounting bar 88, adjacent to torsion rod support bracket 114 is a rectangularly shaped end block 146. The block 146 may be secured in any suitable manner, such as by welding, brazing, etc. The rearwardly bent end 138 of torsion rod 134 is fixedly positioned within a longitudinally extending aperture 148 formed in rectangularly shaped end block 146.

Figure 3:
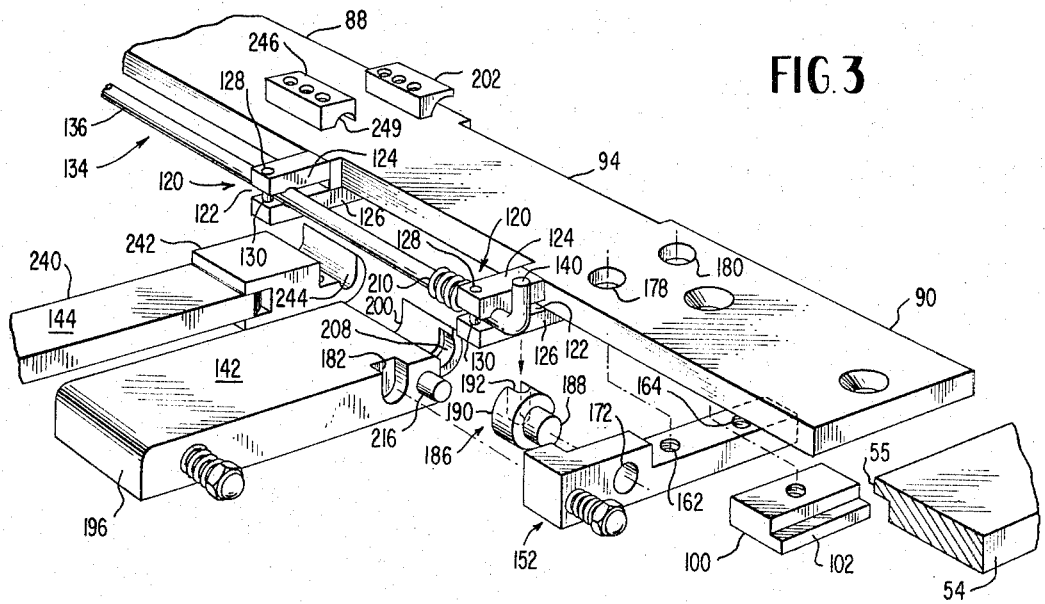
FIGURE 3 is a fragmentary view of the apparatus of this invention and in particular brings out the inter-relationship of its various parts.
Figure 4:
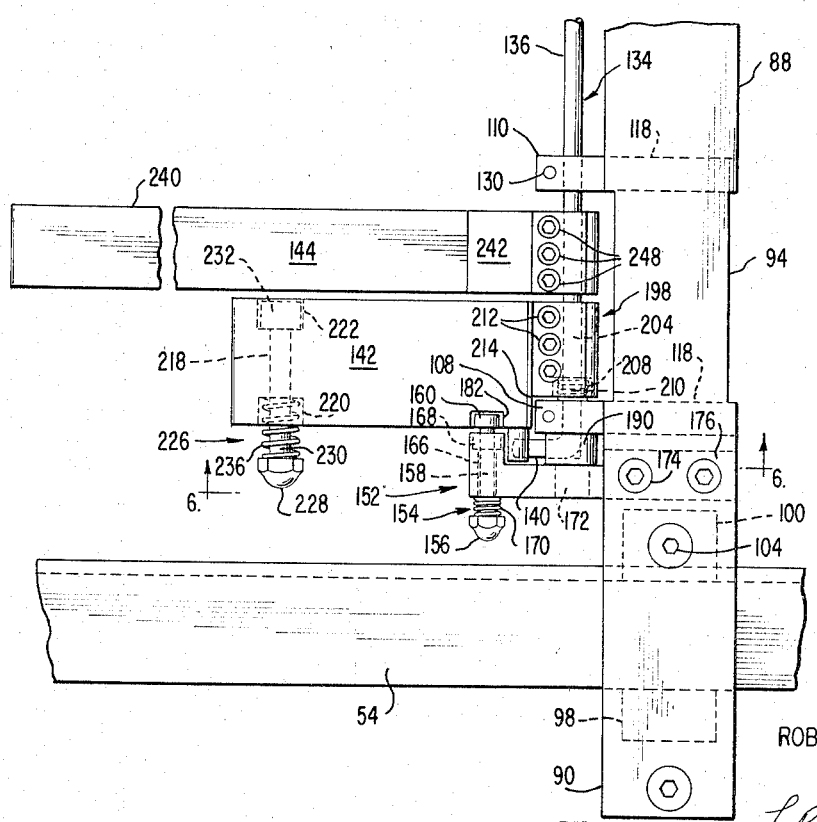
FIGURE 4 is a plan fragmentary view of the apparatus of the invention, similar to FIGURE 2, but illustrates the truss lifting bar in its spring loaded or cocked position.

Referring to FIGURE 3, a locking bolt bracket 152 is fastened to elongated mounting bar 88 by bolts 174 and 176 received in apertures 178 and 180 of elongated mounting bar 88 and threaded apertures 162 and 164 of locking bolt bracket 152. As is seen in FIGURE 4, the bracket 152 carries a locking bolt 154, having a head 160, shank 158 and nut 156 threaded to the terminal end of shank 158. As will become apparent, the locking bolt 154 is effective to lock the lift bar assembly 142 in its cocked or spring loaded lowered position, and is thereafter responsive to pressure from press 16 to unlock and thereby permit the lift bar to be elevated by torsion rod 134. The locking bolt bracket 152 extends transversely to the elongated mounting bar 88, adjacent to the lift bar assembly 142, and the twistable upwardly projecting hooked end 140 of torsion rod 134. Looking to FIGURES 3 and 4, the left end of the locking bracket 152 is provided with a laterally extending aperture 166 which receives locking bolt 154 for slidable movement therethrough under the bias of spring 170. Further, laterally extending aperture 166 terminates in an enlarged section 168 adapted to receive the head 160 therein. As shown, spring 170 is concentrically mounted about the shank 158 of locking bolt 154 between the edge of locking bolt bracket 152 and nut 156, to bias the locking bolt 154 in an outwardly projecting manner. The outward projection of bolt 154 is limited by the abutment of head 160 against the top of enlarged section 168.

The locking bolt 154 is operable upon a force of sufficient magnitude being applied thereto, to be moved in a lateral direction against the biasing of spring 170 such that its head 160 will project into a recess 182 formed in the edge of lift bar assembly 142 (FIGURES 3 and 4), in a manner to be described hereinbelow. When in this recess, the locking bolt 154 holds the lift bar in the cocked lowered position shown in FIGURE 6. Thereafter, as a result of a pressing operation being conducted upon leading reaction pad assembly 76, see FIGURE 7, bolt 154 will be freed and withdrawn from recess 182, by action of its biasing spring 170, to enable the lift bar assembly 142 to be driven to its elevated position by hooked end 140 of torsion rod 134, and thus lift the leading end of completed truss 20 from the jig 14. This operation will be explained in more detail hereinafter.

A second laterally extending aperture 172 is provided in locking bolt bracket 152 inwardly from locking bolt aperture 166 for rotatably mounting a support lug, generally shown by the numeral 186. The support lug 186, see FIGURE 3, includes a stud 188 and an enlarged cylindrical end 190. The end 190 is provided with a radially extending slot 192, into which the twistable hooked end 140 of torsion rod 134 is positioned.

The torsion rod which is made of high grade spring steel rod material, generally indicated by the numeral 134, provides, in a manner well known to those skilled in the art, the principal operating force for the truss elevating assembly 86 of this invention. Torsion rod 134 comprises the main longitudinal extending rod 136, rotatably mounted within support brackets 108 through 114, with its rearwardly bent end 138 fixedly held within longitudinal aperture 148 of the rectangularly shaped end block 146. As illustrated in FIGURES 3 and 4, the hooked end 140 of the torsion rod 134 is received within radially extending slot 192 of support lug 186 such that the main longitudinal extending rod 136 may be twisted relative to its fixed upper end 138, upon a twisting force being applied to hooked end 140 in a manner to be more fully treated hereinbelow. Thereafter, upon the twisting force being removed, the torsional force is effective to return the hooked end 140 to its original position.

The structure by which the leading end of a completed truss 20 is elevated from the universal jig assembly 14 upon which it is carried will now be discussed in greater detail. Pivotally mounted upon torsion rod 134, between torsion rod support brackets 108 and 110, are lift bar assembly 142 and cocking bar assembly 144. The lift bar assembly 142 is operable, in a manner to become clear hereinbelow, to twist the hooked end 140 of torsion bar 134. As previously explained, the lift bar assembly 142 is maintained in its spring loaded or cocked position by the projection of locking bolt 154 into recess 182 until a pressing operation is completed upon the leading reaction pad assembly 76, whereupon the locking bolt 154 is withdrawn and the lift bar is driven upwardly into the elevated position shown by FIGURE 7, to result in the elevation of the leading end of the completed truss 20 for positioning upon unloading roller assembly 22. The cocking bar assembly 144 is considerably longer than lift bar assembly 142 to provide adequate leverage to move the lift bar into its cocked position, see FIGURE 6.

As shown by FIGURES 2 through 5, the lift bar assembly 142 and cocking bar assembly 144 extend in a longitudinal direction, parallel to upper horizontal guide bar 54 and lower horizontal guide bar 56. The lift bar assembly 142 includes a rectangular shaped lift bar 196 which is of adequate length to insure that the leading end of the completed truss 20, regardless of the size of truss being manufactured, will be sufficiently elevated to be positioned upon the front stripper roller 24 of the unloading roller assembly 22 as the jig progresses through the press 16, see FIGURE 7. The lift bar assembly 142 includes at its right end an integral mounting bracket generally shown by the numeral 198 to provide pivotable mounting of the lift bar assembly 142 on torsion rod 134. As is best seen in FIGURE 3, mounting bracket 198 is made up of a lower arcuately shaped section 200 and an upper retainer section 202, each of which is cut away so that together they form a bore 204 for the rotatable receipt of the main longitudinal extending rod 136 of torsion rod 134. The portion of the bore 204 of lower arcuately shaped section 200 and the portion in upper retainer section 202 are provided with opposed enlarged arcuate recesses 206 to form an enlarged cylindrical section 208 (FIGURE 4) to receive a torsion rod release spring 210. Bolts 212 fasten the upper retainer section 202 to the lower arcuately shaped section 200 after the main longitudinally extending rod 136 of torsion rod 134 has been rotatably received therewithin. For reasons which will become clear, mounting bracket 198 of lift bar assembly 142 has a corner cut away at 214. The release spring 210 is shown in FIGURE 2 to be concentrically mounted about main longitudinally extending rod 136 of torsion rod 134, between the notched corner 214 and torsion rod support bracket 108.

As shown in FIGURE 3, lift bar 196 has a cylindrical stud 216 projecting from its edge, between the notched corner 214 and recess 182. The stud 216 provides the means for engaging and twisting the upwardly projecting hooked end 140 of torsion rod 134, see FIGURE 6, to thus cock the lift bar assembly for response to a pressing operation at the leading reactor pad assembly 76. The lift bar is held in its cocked position by locking bolt 154 which enters recess 182. The other end of the lift bar 196 is provided with a transversely extending aperture 218 having enlarged counterbores 220 and 222, see FIGURE 4.

Figure 5:
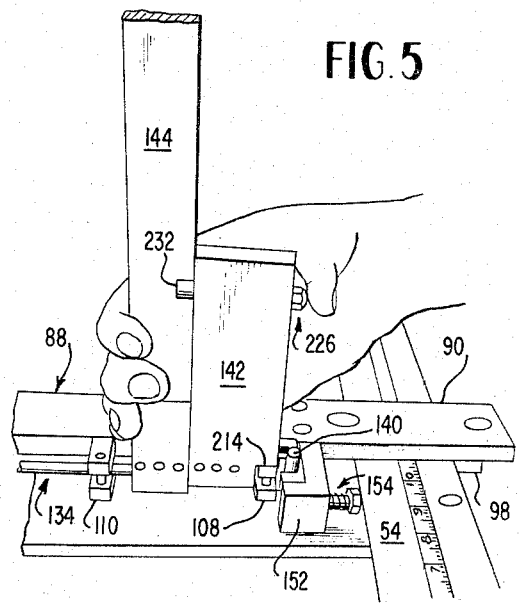
FIGURE 5 is a fragmentary perspective view of the truss elevating device of this invention and illustrates the positions of the cocking bar assembly and lift bar assembly relative to the torsion rod, prior to the cocking of the lift bar assembly.

Slidably received within aperture 218 is a cocking bar locking bolt shown generally at 226. As shown in FIGURES 2 and 5, cocking bar locking bolt 226 is provided with a nut 228, a shank 230, and an enlarged head 232 within the counterbore 222. Positioned concentrically about the shank 230 of cocking bar locking bolt 226, between its nut 228 and counterbore 220, is a biasing spring 236. The cocking bar locking bolt 226 has its nut 228 normally outwardly biased by spring 236. In operation, the locking bolt is moved in against the outward biasing force of spring 236, until the head 232 projects through the counterbore 222. The projecting head 232 can then be engaged by the cocking bar assembly 144 to permit cocking of the lift bar assembly 142 by movement of the cocking bar in a counterclockwise direction.

The cocking bar asembly 144 is also pivotably mounted to the main longitudinal extending rod 136 of torsion rod 134, adjacent to the lift bar assembly 142, in a manner shown in the FIGURES 2 through 5. As shown, the cocking bar assembly 144 includes an elongated cocking bar 240 which is fixedly connected as by welding, brazing, etc., to a suitable mounting support 242. The mounting support 242 terminates in an arcuate bracket 244 having a retainer 246 secured thereto by screws 248, after the main longitudinally extending rod 136 of torsion rod 134 has been rotatably received therebetween. Both the retainer 246 and the arcuate bracket 244 are provided with longitudinal arcuate slots 249, which extend therethrough, for rotatable receipt of the main longitudinal extended rod 136 of the torsion bar 134. As shown in FIGURES 2 through 5, the lateral dimensions of the lift bar assembly 142 and the cocking bar assembly 144 are such that together they are substantially equal to the lateral spacing between torsion rod support brackets 108 and 110. The notched corner 214 of mounting bracket 198 is accordingly necessary in order to provide release spring 210 a mounting position upon the main longitudinal extending rod 136 of torsion rod 134.

The invention has now been fully described as providing a lift bar assembly 142 which is operative to elevate the leading end of a completed truss 20, in a manner shown by FIGURE 7. However, it has been found that on rare occasions, primarily during the manufacture of very long, limber trusses, the leading end of the truss, even though it is elevated in the manner shown by FIGURE 7, may still be improperly positioned for surmounting the front stripper roller 24. To insure, on these instances, that the leading end of the truss will be properly positioned upon the front stripper roller 24, a ramp 250, as shown by FIGURES 1 and 7, is provided. The ramp 250 serves the purpose of insuring proper transfer for the trusses whose leading ends are downwardly flexed, relative to the front stripper roller 24, and which accordingly are not properly disposed for positioning thereupon, by redirecting the leading end of the truss up the ramp 250, thus enabling it to be properly positioned upon the front stripper roller 24.

Ramp 250 is shown in FIGURES 1 and 7 to be triangular in cross section and is positioned along the path of truss travel, immediately in front of the front stripper roller 24. As illustrated in FIGURE 7, the ramp 250 extends angularly upwardly from a position below and in front of the front stripper roller 24 to a position aligned with the upper surface thereof. While FIGURE 1 illustrates the ramp 250 to extend across the entire conveyor 12, it could be of considerably shorter dimension and be restricted to the path of travel that the leading end of a compleed truss 20 takes along the conveyor 12. Ramp 250 is rigidly secured in the position shown, slightly below and in front of front stripper roller 24, by a pair of angles 258 each having legs 260 and 262. The legs 260 of each of the angles 258 are fixedly connected, as by welding, brazing, etc., to the ends 254 of ramp 250. The other legs 262 of each of the angles 258 are secured to opposite stands 29 by way of bolts 264. As a result the ramp 250 is rigidly mounted in the position shown by FIGURES 1 and 7 to insure smooth transfer of the leading end of trusses 20 to front stripper roller 24.

In operation the elongated mounting bar 88 is clamped to the upper horizontal guide bar 54, as close to the leading reaction pad assembly 76 as the weight and size of the truss being manufactured permits, such that lift bar assembly 142 is below the bottom chord 32 of truss 20. Cocking bar assembly 144 and lifting bar assembly 142, which are in their outer positions as shown in FIGURE 2, are then jointly upwardly pivoted about torsion rod 134. The lift and cocking bar assemblies 142 and 144 are then jointly, laterally moved against release spring 210, as shown in FIGURE 5, to compress the release spring within the enlarged cylindrical section 208 of the lift bar mounting bracket, until cylindrical stud 216 on the lift bar assembly 142 assumes a position immediately behind the upwardly projecting hooked end 140 of torsion rod 134.

The cocking bar assembly 144 is then further upwardly displaced, slightly behind lift bar assembly 142, see FIGURE 5, and cocking bar locking bolt 226 is pushed in against the biasing force of spring 236, such that head 232 projects through the lift bar 196. The cocking bar assembly 144 is then moved forwardly to engage and frictionally lock the cocking bar locking bolt 226 in its projecting position.

Thereafter, using the cocking bar assembly 144 as a lever, the lift bar assembly 142 is rotated downwardly to place both bars in the cocked position shown by FIGURES 4 and 6, against the internally developed opposing restitution force of torsion rod 134. This downward movement of lift bar assembly 142 results in hooked end 140 being twisted to the position shown by FIGURE 6. The twisting of hooked end 140, while its other rearwardly bent end 138 is fixed, will, of course, result in the twisting of the torsion rod 134 against its internally developed opposing force of restitution.

The cocked lift bar assembly 142, as shown in FIGURE 6, will therefore be subjected to a considerably upwardly directed force by the twisted hooked end 140 acting upon cylindrical projection 216, and the force to which it is subjected is of such magnitude that the lift bar assembly 142 would immediately be driven to its elevated position of FIGURE 7, if suitable preventative steps are not taken. Accordingly, upon lift bar assembly 142 and cocking bar assembly 144 assuming the cocked position shown by FIGURES 4 and 6, locking bolt 154, carried by locking bolt bracket 152, is laterally displaced against the biasing force of spring 170, to result in the projection of head 160 into recess 182 of the lift bar assembly. As a result of the upwardly directed internally developed force of restitution of torsion rod 134 acting upon the lift bar assembly 142, by way of the contact between hooked end 140 of torsion rod 134 and the cylindrical projection 216 of the lift bar assembly 142, locking bolt 154 will be prevented from being withdrawn by its biasing spring 170 and is effective to retain the lift bar assembly in its cocked position.

Upon the lift bar assembly 142 being locked in its cocked position, shown by FIGURES 4 and 6, by locking bolt 154, the cocking bar assembly 144 will be slightly elevated to release the locking pressure on cocking bar locking bolt 226. Immediately upon the elevation of cocking bar assembly 144, locking bolt 226 will be moved laterally outwardly by the biasing force of spring 236. Thereafter, cocking bar assembly 144 will assume the lowered position shown in FIGURE 4.

It should be appreciated that lift bar assembly 142 will be cocked in a manner as hereinabove described prior to the clamping of top and bottom chords 30 through 36, and web members 38 through 44 in the jig assembly 14. Also, as has been mentioned hereinbefore, the truss elevating assembly 86 of this invention is positioned in close proximity to the leading reaction pad assembly 76 which is initially subjected to the pressing action of press 16, with the lift bar assembly 142 being positioned below the lower chord 32 of the truss as shown in FIGURE 1 and FIGURE 6.

When the jig assembly 14 is advanced into press 16, and the pressing operation occurs at the leading reaction pad assembly 76, the chords 32 and 36 are driven downwardly against the teeth of the unitary connector 18, upon which they are seated, to a position substantially as shown by FIGURE 6. Due to the close proximity of the lift bar assembly 142 to the leading reaction pad assembly 76, it is subjected to pressure to result in its downward displacement. While the downward displacement of lift bar assembly 142 may not be great, it is sufficient to enable the locking bolt 154, which is frictionally locked between the cocked lift bar assembly 142 and the enlarged terminal end 168 of locking bolt bracket 152, to be returned to its normal position by biasing spring 170. Upon the removal of locking bolt 154, the twisted hooked end 140 of torsion rod 134 attempts to drive the lift bar assembly 142 to the position shown in FIGURE 7. More specifically, the cooperating engagement between twisted hooked end 140 of torsion rod 134 and cylindrical stud 216 on lift bar assembly 142 attempts to drive the lift bar assembly to its elevated position of FIGURE 7 immediately after the occurrence of the pressing operation at the leading reaction pad assembly 76. However, this action is resisted by press 16, for so long as the leading portion of the jig assembly 14 remains beneath its head.

The continuing forward advancement of conveyor 12 and the pressing of press 16 results in a sufficient portion of the jig assembly 14 projecting rearwardly of press 16 so that the torsion rod 134 driven lift bar assembly 142 is able to progressively assume the substantially vertical position of FIGURE 7 and thus result in the elevation of the forward end of the truss 20.

The continuing forward movement of jig 14 results in the remaining reaction pad assemblies being sequentially positioned beneath the head of press 16 and the pressing of the unitary connectors 18 associated therewith into the various chords and web members. Concurrently therewith, the forward end of the jig will have progressed longitudinally toward the front stripper roller 24, and as, a result of the truss elevating assembly 86 and ramp 250, the leading end of truss 20 is positioned upon the front stripper roller 24, as shown by FIGURE 7. At the same time the universal jig assembly 14 continues its forward movement upon conveyor 12, below the ramp 250 and the unloading roller assembly 22 to result in the lifting of completed truss 20 upon the unloading roller assembly 22, as shown in FIGURE 1.

Upon the forward end of completed truss 20 engaging front stripper roller 24, the lift bar 196 will fall to its normal horizontal uncocked position as shown by FIGURE 2 by virtue of the following. Lift bar assembly 142, after being driven to its elevated position as shown by FIGURE 7 by the action of torsion rod 134 elevationally supports the leading end of truss 20, with the weight of truss 20 preventing the lift bar from being laterally displaced by the compressed release spring 210. However, after the leading end of truss 20 engages the front stripper roller 24, lift bar assembly 142 is transversely moved from its engaged position with hooked end 140 by release spring 210, and thereafter, with nothing to support it in its upright position, it falls back to the position shown by FIGURE 2.

The completed truss 20 has now been removed from its jig 14 to the unloading roller assembly 22, from which it may be removed either manually or by means of an automatic unloader.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. Apparatus for elevating structural members comprising, a movable lift bar positionable between a lowered cocked position and an elevated position, resilient biasing means, means for coupling said lift bar to said resilient biasing means, said lift bar being movable into its cocked position against the biasing action of said resilient biasing means, and releasable locking means locking said lift bar in its cocked position against the biasing action of said resilient means, said locking means disengaging said lift bar in response to pressure being applied to said structural members, enabling said lift bar to assume its elevated position by the action of said resilient biasing means and thus elevating the structural members resting thereupon.

2. The elevating apparatus as set forth in claim 1 wherein said resilient biasing means comprises a torsion rod having one end thereof fixedly mounted and its other end free for engagement by said means for coupling said lift bar to said resilient biasing means.

3. The elevating apparatus as set forth in claim 2 wherein said lift bar is pivotally mounted on said torsion rod for movement between its cocked and elevated positions.

4. The elevating apparatus as set forth in claim 2 wherein said means for coupling said lift bar to said resilient biasing means includes a projecting element fixedly mounted to said lift bar for engagement with the free end of said torsion rod.

5. The elevating apparatus as set forth in claim 4 wherein said releasable locking means includes a resiliently biased member having a normal first position remote from said lift bar and assuming an engaging position therewith by movement of said element against its resilient biasing member.

6. The elevating apparatus as set forth in claim 5 including, a cocking lever rotatably mounted on said torsion rod adjacent said lift bar on the side thereof opposite to said hooked end of said torsion rod, said lift bar carrying a resiliently biased projection, said resiliently biased projection normally being remote from said cocking lever, and engageable by said cocking lever in response to movement of said projection against its resilient biasing means, said lift bar being moved to its cocked position by the cooperation of said cocking lever and said displaced projection of said lift bar.

7. The elevating apparatus as set forth in claim 1 wherein said resilient biasing means comprises a torsion rod having one end thereof fixedly mounted and its other end terminating in a hook, said lift bar rotatably mounted about said torsion rod proximate said hooked end thereof, said lift bar carrying a projection for engagement with said hooked end of said torsion rod.

8. The elevating apparatus as set forth in claim 7 wherein said releasable locking means includes a resiliently biased member having a normal first position remote from said cocked lift bar and assuming a position of engagement therewith by movement of said element against said resilient biasing member.

9. The elevating apparatus as set forth in claim 8 wherein said lift bar is provided with a side recess, which extends to the upper surface thereof, in alignment with said resiliently biased member of said releasable locking means to enable insertion of said member thereinto for maintaining said lift bar in a cocked position, and wherein a second resilient means is provided to bias said lift bar and cocking bar away from said hooked end of said torsion rod and thus prevent interference therebetween except in a cocking operation, said cocking bar and said lift bar being movable against the biasing of said second resilient means enabling engagement between said hooked end of said torsion rod and said projection of said lift bar.

10. Apparatus for elevating the leading end of a jig mounted truss concurrent with its passage through a press wherein unitary connectors are embedded into the butt joints formed by the chord and web members making up the truss comprising, an elongated torsion rod having one of its ends fixedly mounted relative to said jig and its other end twistable, a lift bar rotatably mounted to said torsion rod adjacent its twistable end, torsion rod engaging means carried on said lift bar for movement therewith, said torsion rod engaging means of said lift bar engaging said twistable end of said rod during movement into a cocked position, and releasable locking means locking said lift bar in its cocked position against the action of said torsion rod attempting to return its twisted end to its original position, said lift bar being pre-set into its cocked position prior to positioning of the chord and web members of said truss upon said jig, and said releasable locking means being responsive to pressing action by the press to result in the elevation of the leading end of a completed truss upon passage of the jig through said press.

11. The apparatus as set forth in claim 10 wherein said releasable locking means includes a resiliently biased member normally positioned remote from said lift bar and assuming a position by movement of said element against said resilient biasing member.

12. The apparatus as set forth in claim 10 wherein said torsion rod engaging means comprises a projection carried by said lift bar, and wherein said lift bar is provided with a recess which cooperates with said releasable locking means to lock said lift bar in its cocked position.

13. The apparatus as set forth in claim 12 including a resilient biasing means mounted to said torsion rod normally biasing said lift bar's torsion rod engaging means remote from said twistable end of said torsion rod, said torsion rod engaging means being moved into contact with said twistable end of said torsion rod by compression of said resilient biasing means, said lift bar thereafter being moved into its cocked position by the twisting of said twistable end by said torsion bar engaging means, said releasable locking means locking said lift bar in its cocked position.

14. The apparatus as set forth in claim 13, including means for moving said jig through said press, said locking means being releasable in response to a pressing operation to enable said torsion rod to elevate said lift bar and the portion of the truss resting thereupon, the removal of said truss from said jig resulting in said resilient biasing means urging said lift bar away from the twistable end of said torsion rod.

15. The apparatus as set forth in claim 10 including a cocking lever operatively associated with said lift bar to move the same into its cocked position against the action of said torsion rod.

16. The apparatus as set forth in claim 15 wherein said cocking lever is rotatably mounted on said torsion rod adjacent to said lift bar, said lift bar carrying a resiliently biased bolt, said resiliently biased bolt normally biased away from said cocking lever, and engagable by said cocking lever in response to movement of said bolt against its resilient biasing means, said lift bar movable to its cocked position by the cooperation of said cocking lever and said bolt of said lift bar.

17. The apparatus as set forth in claim 16 including a resilient biasing means mounted to said torsion rod normally biasing said torsion rod engaging means of said lift bar away from said twistable end of said torsion rod, said lift bar and cocking lever jointly moved in a direction to compress said resilient biasing means and enable said cocking lever to move said lift bar into its cocked position by twisting said twistable end of said torsion bar by said torsion rod engaging means of said lift bar.

18. Apparatus for removing a completed truss from the jig to which it is mounted after its passage through a press whereat unitary connectors are embedded into the truss comprising releasable lifting means operatively positioned on the jig proximate its leading end, below the leading end of the truss, said jig movable along a predetermined path leading to and through the press, said releasable lifting means operative in response to a pressing operation being conducted upon said leading portion of said truss to permit elevation of the same upon passage through the press, and a pair of longitudinally spaced apart rollers positioned along the path of jig travel, posteriorly of the press, the continuing movement of said jig sub-adjacent said pair of rollers resulting in the elevated truss being removed from said jig and repositioned upon said rollers.

19. Apparatus as set forth in claim 18 including, a ramp fixedly mounted forwardly of the front roller of said pair of rollers, said ramp extending from said front roller downwardly into the path of travel of the elevated leading end of said truss, said ramp aiding in the repositioning of said completed truss upon said pair of rollers without interfering with the jig travel sub-adjacent thereto.

References Cited

UNITED STATES PATENTS

| | | | |
|---|---|---|---|
| 3,068,483 | 12/1962 | Moehlenpah et al. | 227—152 |
| 3,172,125 | 3/1965 | Sanford | 227—152 XR |
| 3,195,449 | 7/1965 | Jureit | 150—257 |
| 3,241,585 | 3/1966 | Jureit | 144—288 |
| 3,255,943 | 6/1966 | Sanford | 227—152 |

BILLY J. WILHITE, *Primary Examiner.*